(No Model.)

F. M. STRONG.
COOKING APPARATUS.

No. 504,256. Patented Aug. 29, 1893.

WITNESSES
Thomas W. Bakewell
C. M. Clarke

INVENTOR
F. M. Strong

UNITED STATES PATENT OFFICE.

FREDERICK M. STRONG, OF WHEELING, WEST VIRGINIA.

COOKING APPARATUS.

SPECIFICATION forming part of Letters Patent No. 504,256, dated August 29, 1893.

Application filed February 3, 1893. Serial No. 460,858. (No model.)

*To all whom it may concern:*

Be it known that I, FREDERICK M. STRONG, of Wheeling, in the county of Ohio and State of West Virginia, have invented a new and useful Improvement in Cooking Apparatus, of which the following is a full, clear, and exact description, reference being had to the accompanying drawings, in which—

Figure 1:
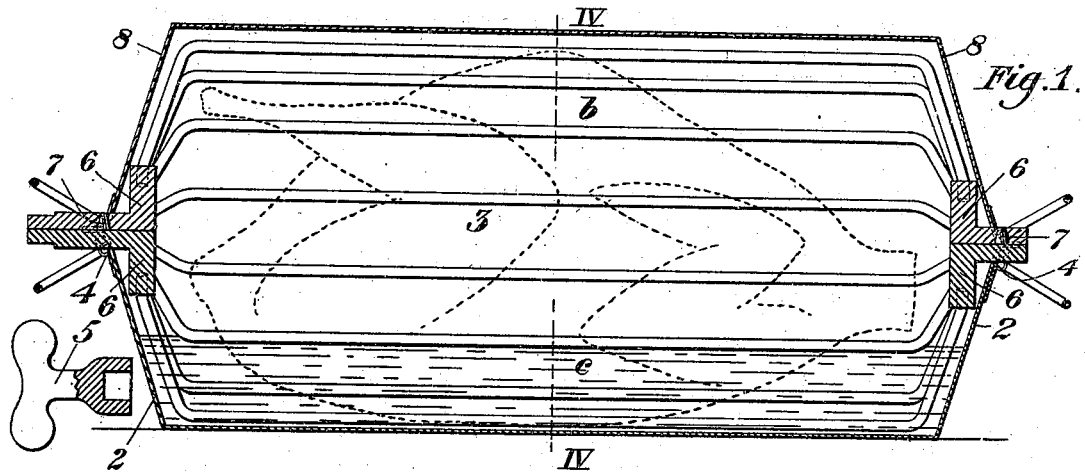
Figure 2:
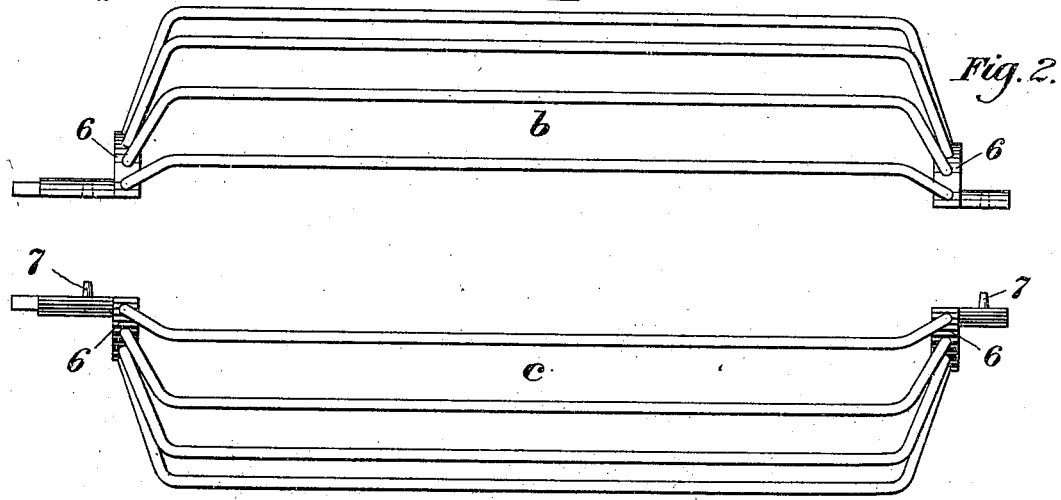
Figure 3:
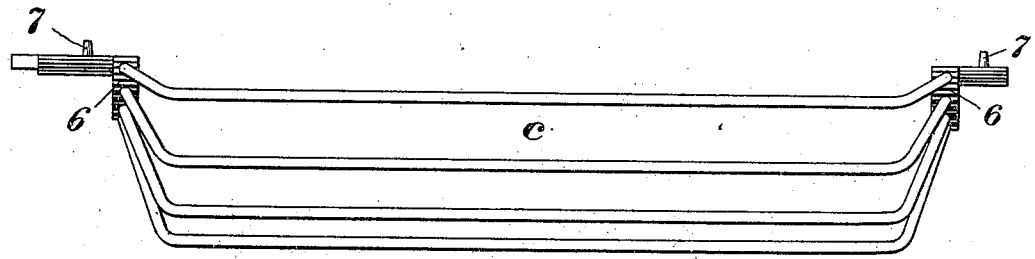
Figure 4:
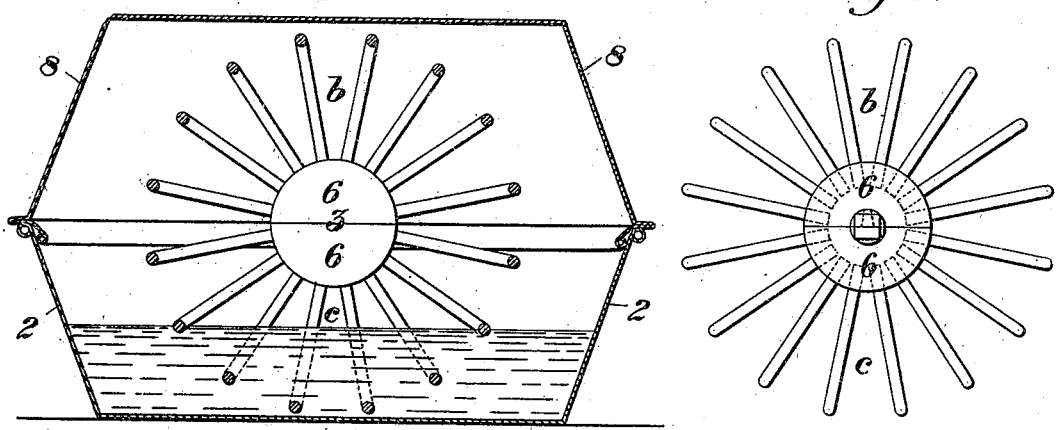

Figure 1 is a side elevation, partly in vertical section, of my improved apparatus. Fig. 2 is a view of the meat-holding frame, with its parts separated. Fig. 3 is an end view of the frame; and Fig. 4 is a vertical cross-section on the line IV—IV of Fig. 1.

The object of my invention is to provide improved means for cooking meats, &c.

In roasting joints of meat, turkeys, &c., in order to get good results, it is necessary that the cook should frequently baste the meat, and this has ordinarily been done by dipping up with a spoon the gravy from the bottom of the pan and pouring it over the meat. The frequency with which this should be done, and the somewhat hot and unpleasant character of the work, tend to make the cook careless and frequently occasion unevenly cooked roasts. This difficulty is avoided by my invention, which affords convenient means for cooking meat with the best possible results.

To this end my invention consists in a pan or suitable receptacle, and means for holding the meat therein and for adapting it to be turned as occasion may require so as to revolve it through the meat juices which collect at the bottom of the pan, thus not only making it possible to change the position of the meat, which in itself is advantageous, but rapidly and thoroughly basting it by bringing its various parts into contact with the juices.

In the accompanying drawings I show what I consider to be the best embodiment of my invention, and I shall now proceed to describe the same, premising that the invention is not limited strictly to the details of construction therein set forth, but that modifications may be made therein such as will suggest themselves to the skilled mechanic. For example, modifications may be made in various ways in the construction of the meat-holder or frame.

In the drawings, 2 represents a pan of suitable form.

The meat-holder consists preferably of a rotatory frame or cage 3, adapted to contain the meat and provided with end trunnions affording means by which, when the trunnions are fitted in sockets or recesses, 4, at the ends of the pan, the frame may be rotated by means of a handle 5 (preferably detachable) fitted to the end of one of the trunnions.

In order to provide means for placing the meat in the frame and removing it therefrom, I preferably form the frame of longitudinally-divided sections $b$ and $c$, and for convenience the division may extend axially through the trunnions and through the head-pieces 6, to which the trunnions are fixed. When thus constructed, the parts of the trunnions designed to be fitted together should be provided with interlocking pins and recesses 7, or other suitable means, by which the parts of the frame may be held together and rotated as a whole. The frame itself is preferably composed of wire rods arranged to constitute a cage of general cylindrical form, the rods fitting into the heads 6 at the ends, and the frame is made of such size relatively to the pan that when set therein it shall extend to or nearly to the bottom thereof, and shall rub somewhat against the pan in order to retard its free revolution and to cause it to remain in any position in which it may be set by rotation on its axis. This rubbing of the frame against the pan is, however, not essential to the invention, broadly considered, and other means of applying friction to the frame may be used.

In using the device, the meat is set within the frame, whose parts being fitted together are set within the pan as shown in Fig. 1, and a second pan or cover 8 is preferably set over it in order to afford a closed space for the meat and to prevent loss of the juices by evaporation. The pan containing the frame and the meat is then set in an oven, the heat of which cooks the meat and causes the exuding juices to collect in the bottom. When it is desired to turn and baste the meat, the cook applies the handle to the trunnion of the frame and turns it once or more on its longitudinal axis, thus causing the meat to revolve in contact with the juices at the bottom and to be basted thereby, care being preferably taken to leave the frame in a different position from that which it originally occupied, so as to bring a different part of the meat uppermost. This procedure is continued from time to time until the meat has been cooked, and as it dispenses with the necessity of dipping up the juices with a spoon, as in former practice, the work is easy and can be conducted without discomfort and without burning the hands of the cook. If desired, in order to make it unnecessary to open the oven door frequently, a small hole may be made therein to permit passage of the turning handle.

The advantages of my improvement will be appreciated by those having occasion to use the same. The meat cooked in it will be regularly roasted; and by reason of the uniformity of the basting, the apparatus gives better results than are otherwise possible.

I claim—

1. In roasting apparatus, the combination with a pan, of a rotatory cage therein, said cage being arranged to hold the meat and bring it in contact with the juices at the bottom of the pan; substantially as described.

2. The combination of a closed pan, and a rotatory open-frame, or cage which holds the meat within the pan in contact with the juices at the bottom, and adapts it to be turned therein, said frame being made in sections; substantially as described.

3. The combination of a closed pan, and a rotatory open-frame or cage, which holds the meat within the pan in contact with the juices at the bottom, and adapts it to be turned therein, said frame having end trunnions enabling it to be turned axially; substantially as described.

4. The combination of a closed pan, and a rotatory open wire frame or cage, which holds the meat within the pan in contact with the juices at the bottom, and adapts it to be turned therein; substantially as described.

In testimony whereof I have hereunto set my hand.

FREDERICK M. STRONG.

Witnesses:
THOMAS W. BAKEWELL,
W. B. CORWIN.